SMITH & COLLIER.

Cotton-Planter

No. 25,449. Patented Sept. 13, 1859.

Witnesses:
E. Tooley
L. P. Hughes

Inventor:
P. M. Smith
T. T. Collier

UNITED STATES PATENT OFFICE.

P. M. SMITH AND T. T. COLLIER, OF LAVERNIA, TEXAS.

IMPROVEMENT IN COTTON-SEED PLANTERS.

Specification forming part of Letters Patent No. 25,449, dated September 13, 1859.

*To all whom it may concern:*

Be it known that we, P. M. SMITH and T. T. COLLIER, of Lavernia, in the county of Bexar and State of Texas, have invented a new and Improved Cotton-Planter; and we do hereby declare that the following is a full, clear, and exact description of the same, reference being had to the accompanying drawings, forming a part of this specification, in which—

Figure 1:
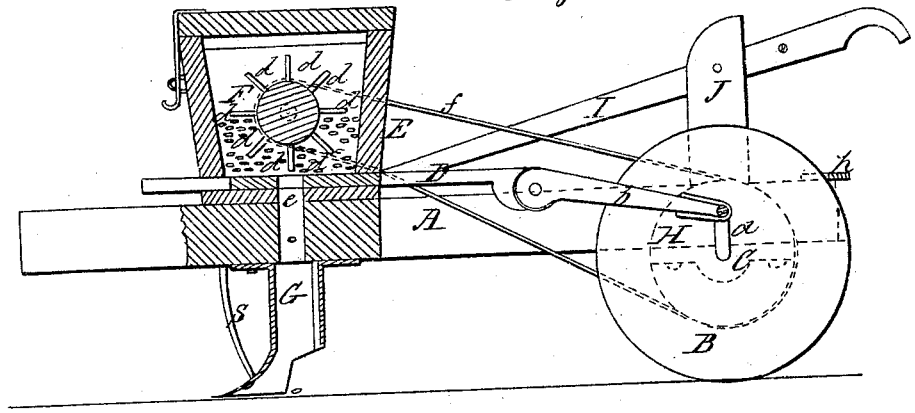
Figure 2:
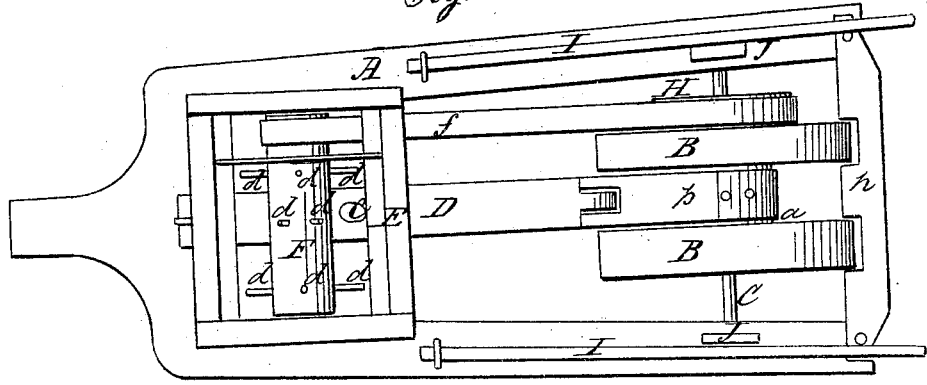

Figure 1 is a longitudinal vertical section of our invention. Fig. 2 is a plan or top view of the same.

Similar letters of reference in both figures indicate corresponding parts.

This invention consists in arranging over a reciprocating slide an agitator which serves to facilitate the discharge of the seed from the hopper through a hollow wrought-iron plow-share, said agitator being operated from a pulley on the same shaft which gives motion to the slide, so that both move simultaneously.

To enable others skilled in the art to make and use our invention, we will proceed to describe its construction and operation.

A frame, A, of wood or any other suitable material, rests on wheels B, which are mounted on an axle, C, that forms a crank, $a$, which connects by means of a pitman, $b$, with a reciprocating seed-slide, D. This slide moves in a recess in the bottom of the hopper E, and it is furnished with one seed-cell, $c$.

Arranged in the hopper, and extending through its whole length, is the agitator E, which consists of a roller with a series of pins, $d$, inserted in a spiral direction, so that by their action the seed is driven into the seed-cell $c$. The agitator is set in motion by a belt or chain, $f$, from a pulley, H, on the axle C.

Under the slide and in the center of the hopper-bottom there is an opening, $e$, which leads to a hollow wrought-iron plowshare, G, that is secured to the under side of the frame A with fender-bar S.

The machine is guided in its motion by two handles, I, which are secured to standards J on the back end of the frame A, their front ends being fastened down to the beams by means of staples or in any other convenient manner, and a guard, $h$, extends from one side of the frame to the other, close behind the wheels, so that the operator is protected from injury by coming in contact with the wheels.

The operation is as follows: As the machine is drawn through the field a furrow is made by the share G, which receives the seed. The seed is forced into the seed-cell $c$ as the slide D pauses under the agitator F, and whenever the seed-cell passes over the discharge-opening $e$ the seed drops down through this opening and through the hollow share underneath to the ground. The agitator is so arranged that one of the pins $d$ stands directly over the seed-cell $c$ as the same passes over the discharge-opening $e$, so that no more seed escapes but what has previously found its way into the seed-cell, and in order to obtain this object it is necessary to move the agitator by means of a chain and from the same axle which gives motion to the slide $d$, so that their motions never fail to correspond.

We disclaim the use of this machine for any other purpose than that of planting cotton.

What we claim as new, and desire to secure by Letters Patent, is—

The arrangement and combination of the wheels B, axle C, crank $a$, pulley H, slide D, agitator F, fender-bar S, plowshare G, and scraper $h$, substantially as and for the purpose described.

P. M. SMITH.
T. T. COLLIER.

Witnesses:
E. TOOLE,
L. P. HUGHES.